Dec. 8, 1964　　C. L. KEY, JR., ET AL　　3,160,848
MAGNETOSTRICTIVE TRANSDUCER
Filed May 16, 1960　　2 Sheets-Sheet 1
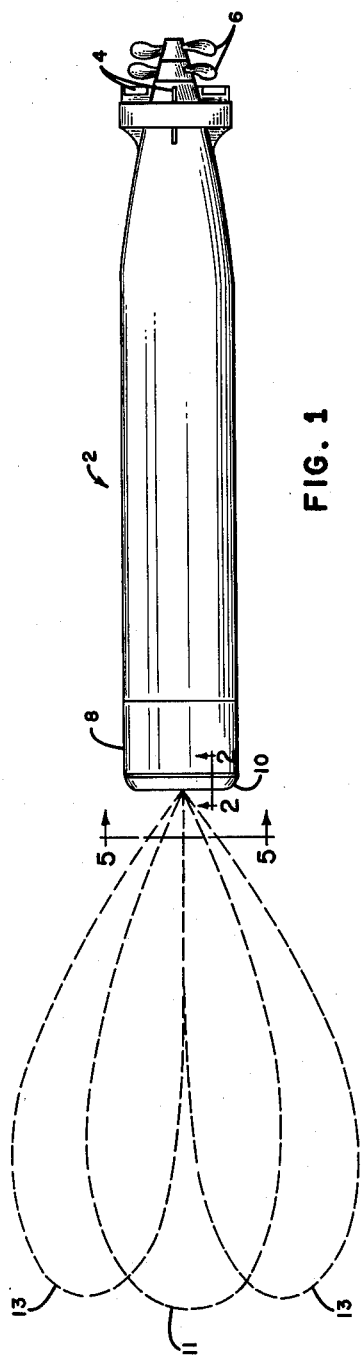
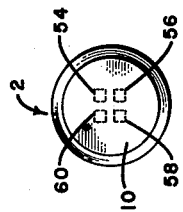
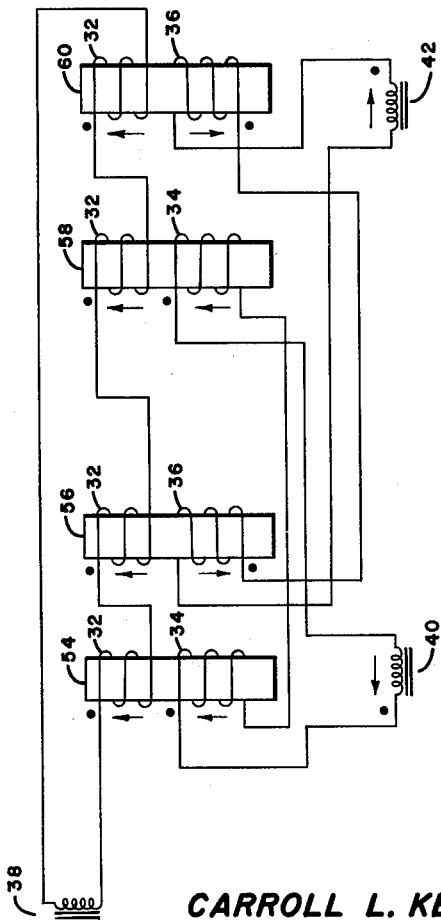
CARROLL L. KEY, Jr.
DONALD T. LAIRD
JAMES M. LAWTHER
INVENTOR.
BY
*V.C. Muller*
ATTORNEYS Dec. 8, 1964    C. L. KEY, JR., ET AL    3,160,848
MAGNETOSTRICTIVE TRANSDUCER
Filed May 16, 1960    2 Sheets-Sheet 2

CARROLL L. KEY, Jr.
DONALD T. LAIRD
JAMES M. LAWTHER
        INVENTOR.

BY

ATTORNEYS

United States Patent Office 3,160,848
Patented Dec. 8, 1964

3,160,848
MAGNETOSTRICTIVE TRANSDUCER
Carroll L. Key, Jr., Donald T. Laird, and James M. Lawther, State College, Pa., assignors, by mesne assignments, to the United States of America as represented by the Secretary of the Navy
Filed May 16, 1960, Ser. No. 29,553
3 Claims. (Cl. 340—6)

This invention relates to detection systems, and in particular to acoustic target-detection and direction-finding systems.

The use of electromagnetic transducers in water in sonic and ultrasonic frequencies is well-known. Transducers are employed for detecting and direction finding of signals emanating from a distance target such as surface vessels or submarines (as may be seen by reference to patent application, Serial No. 629,430, filed November 21, 1956, now U.S. Patent No. 3,082,401, "Directional Underwater Magnetostrictive Transducer," by Richard E. Bland et al.). The transducer is frequently comprised of magnetostrictive units having a general U-shape with an active face located at the bight of the U. Excitation and improved directivity of transducers utilizing such magnetostrictive or electro-responsive units are commonly secured by providing series windings having greater or less number of turns whereby a desired reception-transmission pattern having certain directional characteristics is secured.

In target-detection and location systems involving torpedoes, the transducer frequently consists of an array of U-shaped magnetostrictive units having series windings located at the forward end of the torpedo. One method of operation often employed is to electronically process the sum of the voltage signals from each electro-responsive unit of the array with the voltage signals of the sum of the voltage components of one half of the units of array electrically subtracted from that of the other half. The theory and practice of this system is developed in some detail in the Journal of the Acoustical Society of America, 1952, volume 24, Number I, "The Design of Optimum Directional Acoustic Arrays," by Davids et al., pages 50–56, and in patent application, Serial No. 855,479, filed November 25, 1959, "Cross-Correlation, Target-Detection and Location System," by Carroll L. Key, Jr.

In previous configurations of transducer arrays, single windings on each transducer were used to produce the sum and difference signals necessary for detection. It was found, however, that when windings on each array unit were appropriately adjusted or "shaded" with the proper number of turns to create an optimum or desirable sum pattern, an undesirable difference pattern resulted. Hence, the accuracy and tracking ability of the transducer array was severely limited. This invention solves the problem of optimizing both the array patterns of the sum and difference signals by providing separate turns or windings on each magnetostrictive unit in such a manner that there is no substantial disturbance of the transducer acuity pattern due to interwinding interference. This desirable result is accomplished by providing that the load into which the transducer windings are connected be of a very high impedance so that a negligibly small inductive flux producing current will flow through the windings. In addition, the magnetostrictive units are geometrically positioned in such a manner that should the current flow through the attached windings, the induced voltage produced, will be cancelled by another induced voltage of opposite polarity. Thus, by the use of this invention, any number of windings may be positioned upon each element of a transducer array and operated simultaneously to produce the optimum desired reception patterns with negligible interwinding interference.

It is, therefore, an object of this invention to provide an improved winding system adaptable to transducers not subject to the effects of interwinding-inductive coupling.

It is another object of this invention to provide an improved transducer design by which inductive coupling effects of various elements of the array will be cancelled.

It is still another object of this invention to provide an improved array of magnetostrictive units in which inductive coupling effects between the elements of the array will be eliminated.

These and other objects of this invention and a fuller understanding may be had by referring to the following description and claims taken in conjunction with the accompanying drawings, in which:

FIGURE 1 is a side view of a torpedo, embodying the present invention, having diagrammatic lines indicating the sensitivity patterns produced by the transducer.

FIGURE 4 is a schematic view illustrating the general circuitry of a hypothetical four element array.

FIGURE 5 is a schematic view of FIGURE 1 with reference to line 5—5, illustrating the positioning of the transducers of FIGURE 4.

Figure 3:
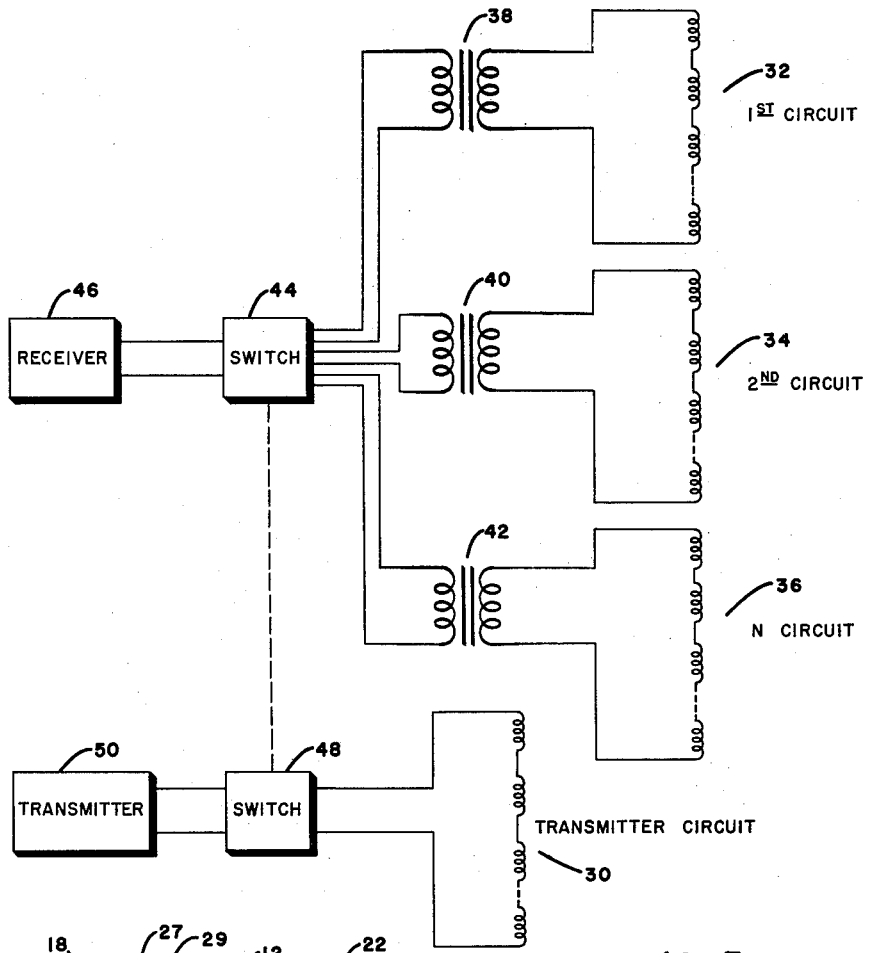
FIGURE 3 is a schematic diagram view illustrating the circuitry of the present invention.

Referring now to FIGURE 1, torpedo 2 is comprised of fin assembly 4, propellers 6, and forward portion 8 having forward diaphragm 10. The acoustical sensitivity lobes or sum pattern 11 and difference pattern 13, produced by the transducer of present invention, are shown by dotted lines and indicate the direction and intensity of acoustic reception and transmission to and from diaphragm 10. These lobes are a graphic representation of the geometric volume acuity of receptivity and transmissibility produced by the array of magnetostrictive elements 12 (shown in FIGURE 2) positioned in forward portion 8 of torpedo 2.

Figure 2:
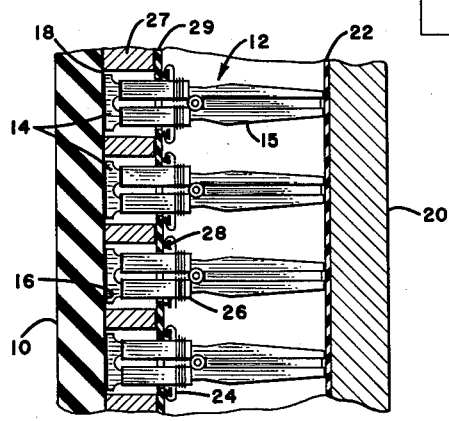
FIGURE 2 is a cross-sectional view of the forward portion of the torpedo of FIGURE 1 with reference to line 2—2 of FIGURE 1.

As is best shown in FIGURE 2, a magnetostrictive vibrator unit 12 is bonded to forward diaphragm 10. Unit 12 comprises a laminated core 15 of general U-shape. The shape of the vibrator unit shown in the drawing is substantially in accordance with that shown and described in Patent No. 2,550,771, issued May 1, 1951, and Patent No. 2,530,224, issued November 14, 1950, to which reference is made. It is to be understood, however, that the present invention may use various other known magnetostrictive cores than the one described.

Solid end 14 of the vibrator unit 12 is utilized to form a working face 16 which is bonded to the inner surface 18 of forward diaphragm 10. As used herein, the working face of each vibrator unit means the face in direct sound transmitting and receiving relation to the fluid medium through which the sound is to be transmitted or received. The forward diaphragm 10 is preferably comprised of "Rho-C" rubber or the like, which is known to have substantially the same acoustic impedance as water and to propagate sound waves in the same manner. A rigid circular back plate 20 is held in fixed face relation with the portion of the transducer 12 and acoustically isolated from the vibrator units 12 by means of pressure release material 22 such as, for example, Fairprene or the like. The windings 24 for each vibrator unit may be wound on the coil forms 26 in any conventional manner, either all in one coil form or divided equally betwen two coil forms of each vibrator unit. The wires leading from the windings terminate at terminal pins 28 secured to board 29 which is supported by grid member 27. Terminal pins 28 are connected in the desired circuitry by a convenient means, as for example a printed circuit.

Reference to FIGURE 3 diagrammizes a simplified block diagram for multiple windings embodied in this invention, including separate transmitter windings 30 and first circuit-receiver windings 32, second circuit-receiver windings 34 and N-circuit-receiver windings 36 connected respectively to transformers 38, 40, and 42 which are, in turn, connected through switch 44 to conventional receiver 46. Likewise, transmitter windings 30 are connected through transmitter switch 48 to transmitter 50. Switch 44 and 48 are so coupled that when one opens the other remains closed, thus preventing the receiver from blanking during transmission. Thus when transmitter 50 is operating, it is connected by switch 48 to transmitter windings 30. Interconnected switch 44 (indicated by the dotted line) simultaneously disconnects receiver 46 from transformers 38, 40 and 42. When receiver 46 is operating, transformer 38, 40, and 42 are connected to the receiver switch 48 disconnects transmitter 50 from transmitter windings 30. The windings 32 of the proper transducer elements are connected in series to the primary of transformer 38 to form a first acoustical pattern. Similarly, windings 34 are connected to form a second pattern and windings 36 a third as desired. For example, the windings 32 may be so varied in circuitry as to produce a sum pattern lobe 11 or single acoustic pattern directionally forward of the torpedo 2. Windings 34 and 36, likewise, may be so connected as to produce a difference pattern or the two acoustical lobes 13. Transmitter windings 30 are utilized to produce a directional acoustic pulse designed to echo from a target and to be received by the receiver windings. In such a case, switches 44 and 48 would operate to disconnect the receiver windings during the period of pulse transmission.

The transformers 38, 40 and 42 are wound to produce a high impedance into which the windings 32, 34, and 36 operate. Thus, while the transducer is receiving, only a small current flows through the circuits. Hence, a negligible inductive flux is produced and little voltage induced in other windings. By this means, the acoustic patterns produced by the windings are not interfered with by induced voltages or secondary effects. The signals emanating from the transformers 38, 40 and 42 through switch 44 to receiver 46 are processed in a manner similar to that described in patent application, Serial No. 855,479, filed November 25, 1959, "Cross-Correlation, Target-Detection, and Location System," by Carroll L. Key, Jr. Other acoustical lobes having varying characteristics for listening and transmitting may be easily provided by adding new windings to each of the array.

Referring now to FIGURE 4, a diagrammatic representation of a hypothetical four unit array contains units 54, 56, 58, and 60 on which are wound sum windings 32 connected to transformer 38 and difference windings 34 and 36 connected to transformers 40 and 42. It will be noted from FIGURE 5 that these four units are positioned on a circle centered at the center of the array, one for each quadrant. Although a four unit array is used for the simplifiation of the description, any number of units may be employed in actual practice. While the current in any one coil will induce a voltage in another coil of that particular unit, it can be seen that because of series-aiding connections of all the sum patterns coils and the bucking configurations for the difference pattern connections (the direction of flux of which is indicated by arrows), any mesh current inducing a voltage in one coil by mutual coupling will induce an equal and opposite voltage in a coil on the diametrically opposing unit. Thus the voltage across the terminals of transformers 40, 42, and 38 owing to the current flow in any windings must vanish. The only voltages developed across the transformers 40, 42 and 38, therefore, are those induced in the windings 34, 36, and 32 respectively, by magnetostrictive effect, when the array is placed in a sound field. The interconnection shown can be used with either so-called "square" or "diagonal" transducer orientations with no interaction voltage appearing at the sum or difference terminals. Thus, as is readily apparent, although current may flow through the coils of the transducers, the total effect due to interaction inductance between the windings at the end terminals of the windings is eliminated. However, the voltage signal due to the sound field impinging upon the transducers is transmitted faithfully through.

Thus, in operation it may be seen that each transducer 12 may be equipped with an unlimited number of windings for producing optimized acoustic reception and transmissions patterns limited only by the face requirements. Because of the geometrical positioning of windings and transducers, the inductive effects between sum and difference windings of current flow through the transducer coils are automatically cancelled out and the high impedance transformer circuit will limit the amount of current allowed to flow in all receiving windings to well below the level where interaction is significant. Hence, a more effective acoustic-torpedo searching array is produced allowing a more effective target-detection system.

Since other varied modifications and equivalents of the invention will occur to those skilled in the art, it is intended that the claims that follow shall not be limited by the particular embodiments of the invention that are shown or described herein, but only by the prior art.

We claim:

1. A multiple reception-pattern electro-acoustic system comprising, in combination:
   (a) an electro-acoustic transducer having an array of magnetostrictive units;
   (b) each said magnetostrictive unit having at least first and second separate windings thereon;
   (c) said magnetostrictive units having their first windings connected to provide a first individual circuit, and having their second windings connected to provide at least a second individual circuit, for yielding signal-induced voltages in accordance with a first reception pattern and at least a second reception pattern, respectively;
   (d) a receiver;
   (e) individual transformers, connected to couple said individual circuits to said receiver;
   (f) and said transformers having comparatively high impedance relative to said individual circuits, whereby to substantially reduce inductive flux-producing currents and correspondingly substantially reduce interwinding interference induced voltages.

2. A multiple reception-pattern electro-acoustic system comprising, in combination:
   (a) a generally circular-faced electro-acoustic transducer having a planar array of magnetostrictive units provided in four quadrants defined in said transducer;
   (b) each said magnetostrictive unit having at least first and second separate windings thereon;
   (c) said magnetostrictive units of said four quadrants having their first windings additively-connected to provide an individual circuit for yielding signal-induced voltages in accordance with a sum-signal pattern;
   (d) said magnetostrictive units of any pair of said quadrants having their second windings differentially-connected to provide an individual circuit for yielding signal-induced voltages in accordance with a first difference-signal pattern;
   (e) said magnetostrictive units of another pair of said quadrants having their second windings differentially-connected to provide an individual circuit for yielding signal-induced voltages in accordance with a second difference-signal pattern;
   (f) a receiver;

(g) and individual transformers connected to couple said signal-induced voltages delivered by said individual circuits to said receiver;

(h) said first and second windings, additively and differentially connected in said individual circuits, coacting to substantially reduce inductive interaction between said individual circuits.

3. A multiple reception-pattern electro-acoustic system as defined in claim 2, wherein:

(i) said transformers have comparatively high impedance relative to said circuits to substantially reduce inductive flux-producing currents, and coact with said additively and differentially connected windings to substantially eliminate interwinding interference induced voltages.

References Cited by the Examiner

UNITED STATES PATENTS

| 2,407,662 | 9/46 | Hart | 340—5 |
| 2,461,635 | 2/49 | Feller. | |
| 2,723,386 | 11/55 | Camp | 340—11 |
| 2,776,416 | 1/57 | Harris | 340—11 |
| 2,861,256 | 11/58 | Hart | 340—6 |
| 2,918,650 | 12/59 | Carruthers et al. | 340—6 |
| 2,984,819 | 5/61 | Miller | 340—11 |

CHESTER L. JUSTUS, *Primary Examiner.*